(12) United States Patent
Choi et al.

(10) Patent No.: US 9,601,156 B2
(45) Date of Patent: Mar. 21, 2017

(54) INPUT/OUTPUT SYSTEM FOR EDITING AND PLAYING ULTRA-HIGH DEFINITION IMAGE

(75) Inventors: Byeong Ho Choi, Gyeonggi-do (KR); Je Woo Kim, Gyeonggi-do (KR); Hwa Seon Shin, Gyeonggi-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 256 days.

(21) Appl. No.: 14/381,754

(22) PCT Filed: Mar. 21, 2012

(86) PCT No.: PCT/KR2012/002036
§ 371 (c)(1),
(2), (4) Date: Dec. 16, 2014

(87) PCT Pub. No.: WO2013/129724
PCT Pub. Date: Sep. 6, 2013

(65) Prior Publication Data
US 2015/0139614 A1    May 21, 2015

(30) Foreign Application Priority Data
Feb. 29, 2012 (KR) .................. 10-2012-0021436

(51) Int. Cl.
*H04N 5/84* (2006.01)
*H04N 5/89* (2006.01)
(Continued)

(52) U.S. Cl.
CPC ......... *G11B 27/031* (2013.01); *H04N 7/0125* (2013.01); *H04N 21/23605* (2013.01);
(Continued)

(58) Field of Classification Search
CPC .. H04N 5/84; H04N 5/89; H04N 5/92; H04N 5/765; H04N 5/77
(Continued)

(56) References Cited

U.S. PATENT DOCUMENTS

| | | | |
|---|---|---|---|
| 9,132,352 B1 * | 9/2015 | Rabin | A63F 13/30 |
| 2008/0253744 A1 * | 10/2008 | Takayanagi | G11B 27/034 386/297 |
| 2011/0219357 A1 * | 9/2011 | Livshits | G06F 9/445 717/115 |

FOREIGN PATENT DOCUMENTS

| | | |
|---|---|---|
| JP | 2007-172318 A | 7/2007 |
| KR | 10-0898700 B1 | 5/2009 |

(Continued)

OTHER PUBLICATIONS

International Searching Authority, International Search Report for PCT/KR2012/002036 dated Jan. 2, 2013 [PCT/ISA/210].

*Primary Examiner* — Daquan Zhao
(74) *Attorney, Agent, or Firm* — Sughrue Mion, PLLC

(57) ABSTRACT

The present invention relates to an input/output system for an ultra high definition image, and more specifically, to an input/output system for an ultra high definition image that may receive an ultra high definition image signal from an external device, process the signal in real time, and output the processed ultra high definition image signal. For this purpose, a system configured to convert data having various resolutions into UHD data of the present invention includes a content input/output device configured to provide data received from a data providing device to an editing device and provide the data received from the editing device to a content reproducing device, and an editing device configured to convert the data received from the content input/output device into UHD data and provide the result to the content input/output device.

7 Claims, 6 Drawing Sheets

(51) Int. Cl.
  *H04N 5/92*   (2006.01)
  *G11B 27/031*   (2006.01)
  *H04N 21/434*   (2011.01)
  *H04N 21/4402*   (2011.01)
  *H04N 7/01*   (2006.01)
  *H04N 21/2343*   (2011.01)
  *H04N 21/236*   (2011.01)
  *H04N 21/472*   (2011.01)
  *H04N 5/765*   (2006.01)
  *H04N 5/77*   (2006.01)

(52) U.S. Cl.
  CPC . *H04N 21/234363* (2013.01); *H04N 21/4342* (2013.01); *H04N 21/4343* (2013.01); *H04N 21/440263* (2013.01); *H04N 21/47205* (2013.01)

(58) Field of Classification Search
  USPC ............... 386/335, 336, 326, 232, 231, 224
  See application file for complete search history.

(56) References Cited

FOREIGN PATENT DOCUMENTS

| KR | 10-2010-0071690 A | 6/2010 |
| KR | 10-2011-0055011 A | 5/2011 |

\* cited by examiner

Fig. 6

| CLASSIFICATION | ITEM | SPECIFICATION |
|---|---|---|
| VIDEO INPUT/OUTPUT CLASSIFICATION | INPUT | 3G/HD-SDI, HDMI, DVI, Pptical, et |
| | OUTPUT | 3G/HD-SDI, HDMI, DVI, Pptical, et |
| | RESOLUTION | 2K, 4K, 8K |
| | AUDIO | • 71 CHANNELS, 222 CHANNELS (SDI Audio Embedding) |
| SUPPORT FORMAT | IMAGE | • 1920X1080P, 8/10/12 BITS, 24/30/48/50/60 Hz<br>• 3840X2160P, 8/10/12 BITS, 24/30/48/50/60 Hz<br>• 4096X2160P, 8/10/12 BITS, 24/48 Hz<br>• 7680X4320P, 8/10/12 BITS, 30 Hz |
| | AUDIO | MAXIMUM 222 CHANNELS, 16/24BITS, 48/96/192 kHz |
| PC INTERFACE | INPUT/OUTPUT | PCIe 2.0 |
| | INPUT/OUTPUT RATE | Line rates form 750 Mb/s to 425Gb/s (X8 Lane) |
| RECORD | RECORDING MEDIUM/CAPACITY | PCIe RAID SSD/30~100 TB |
| | RECORDING RATE | Read/Write up to 1000 MB/sec |
| COMMUNICATION/UI | COMMUNICATION | ETHERNET, RS-232, RS-422/485, USB, AND THE LIKE |
| | UI | FRONT BUTTON, LCD, Application Software |
| PC SPECIFICATION | RESOLUTION | Intel 1366 Core i7/IntelX58 |
| | AUDIO | 7XPCIe 2.0X16 (atX16 orX8 mode) |
| OTHERS | SIZE/(POWER SOURCE) | 4RU OR MORE/(110/220Vac) |

SPECIFICATION OF REAL TIME INPUT/OUTPUT SYSTEM FOR EDITING/REPRODUCING UHD CONTENT

INPUT/OUTPUT SYSTEM FOR EDITING AND PLAYING ULTRA-HIGH DEFINITION IMAGE

TECHNICAL FIELD

The present invention relates to an input/output system for an ultra high definition image, and more specifically, to an input/output system for an ultra high definition image that receives an ultra high definition image signal from an external device, processes the signal in real time, and outputs the processed ultra high definition image signal.

BACKGROUND ART

As image technology changed from an analog method to a digital method, development progressed from SD to HD in order to provide an image much closer to an actual screen. The SD supports a resolution of 704×480 and includes about 350 thousand pixels. Full-HD within HD supports a resolution of 1920×1080, includes 2 million pixels, and provides an image having an image quality much higher than the SD.

The core of a next generation media environment that is predictable and highly likely to be implemented after a currently available HDTV service is an ultra high definition and ultra high resolution image service. Film industries of the world including that of the USA have vigorously produced and shown new digital films called digital cinema since 2006. In the beginning, digital cinema having a size of 2K (2048×1080) that has a similar resolution to HDTV (1920×1080) was common. It has been certain since 2009 that a 4K (4096×2160) resolution and a maximum 16-channel audio may be common.

Meanwhile, in the field of digital broadcasting, as a next generation broadcasting technique, an ultra HDTV (UHD TV) is favored, and UHD content has a resolution of 4K (3840×2160)/8K (7680×4320) and a surround audio of 22.2 channel.

In 2008, the government of Japan announced that UHDTV will be set as a next generation digital broadcasting standard in 2015. Therefore, in order to prepare a media environment including a next generation digital broadcasting technique in advance, technology for capturing, recording, editing, and reproducing UHD content is considered necessary.

SUMMARY OF INVENTION

Technical Problem

The present invention provides a broadcasting device for storing UHD content that may be input/output.

The present invention provides a system for converting received data having various resolutions into UHD data.

The present invention also provides a method of increasing a data converting speed by processing received data in a separate editing device.

Solution to Problem

For this purpose, a system configured to convert data having various resolutions into UHD data of the present invention includes a content input/output device configured to provide data received from a data providing device to an editing device and provide the data received from the editing device to a content reproducing device, and an editing device configured to convert the data received from the content input/output device into UHD data and provide the result to the content input/output device.

For this purpose, a UHD converting system of the present invention includes a content input/output device which includes a digital input/output unit configured to receive data from a data providing device and provide UHD content to a content reproducing device, an encoding/decoding unit configured to encode the data received from the digital input/output unit or encode or decode converted UHD data, an AV processor unit configured to multiplex or demultiplex audio and video data input through multiple channels and deliver synchronized data to a PCIe processor unit, and the PCIe processor unit configured to instruct temporary storage of the synchronized data received from the AV processor unit; and an editing device configured to edit the data received from the content input/output device.

Advantageous Effects of Invention

The UHD converting system of the present invention converts data having various resolutions into UHD data and provides the result to a UHD reproducing device. Also, according to the present invention, a separate editing device processes the data or compresses/encodes the received data. Therefore, it is possible to decrease a load on the content input/output device.

BRIEF DESCRIPTION OF DRAWINGS

FIG. 6 illustrates a specification of an input/output system for an ultra high definition image according to an embodiment of the present invention.

DETAILED DESCRIPTION OF EMBODIMENT

Figure 1:
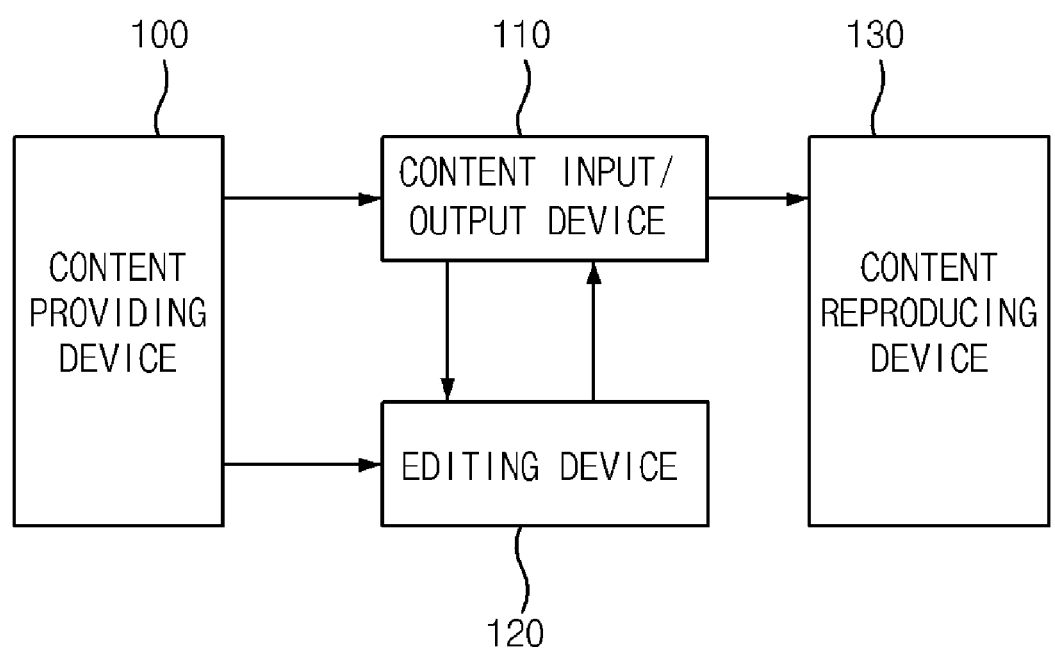
FIG. 1 illustrates an input/output system for an ultra high definition image according to an embodiment of the present invention.

The above-described aspects and additional aspects of the present invention will be apparent from exemplary embodiments to be described with reference to the accompanying drawings. Hereinafter, in order to facilitate understanding and reproduction by those skilled in the art, the present invention will be described in detail by explaining exemplary embodiments.

In the present invention, a broadcasting device for storing UHD requires the following techniques.

1. Technique for Inputting/Outputting UHD Content in Real Time

An employing specification (such as SMPTE292M and SMPTE372M) is considered.

A bandwidth is considered: 3.x Gbps band, 7.x Gbps band, and 30 Gbps band.

Implementation of a commercial interface for a test (such as HD/3G-SDI and HDMI) is considered.

A bus specification for storing/reproducing is reviewed and selected.

2. Lossless UHD Image Compression Technique And visually Lossless Compression Technique for Editing (Video Compression Technique)

In the lossless image compression technique, an algorithm of increasing a compression ratio with minimum complexity is developed based on ISO/IEC 14495-1/2 (JPEG-LS) or an FFV1 algorithm having a high compression ratio.

In particular, the compression ratio will be increased using an inter-plane correlation of R/G/B. However, due to characteristics of lossless compression such as a low compression ratio of 1/2 to 1/3, difficulty in storing UHD content, and particularly, storing an 8K image in real time, is expected. Alternatively, a visually lossless image compression technique for editing is simultaneously developed.

3. Lossless Multi-Channel Audio Compression Technique (Audio Compression Technique)

In a lossless audio codec technique having low complexity and high efficiency, the number of maximally supportable channels is 1023 ch, supportable sample analysis is 8, 16, 24, and 32 bits, IEEE 32-bit floating point, and a maximum sampling frequency is 192 kHz. Based on MPEG-4 ALS that may provide scalability higher than other lossless audio compression codec and a high quality audio, low complexity performance is improved.

When the lossless audio codec having low complexity is developed, it is possible to solve a data size problem of PCM data and an influence on an entire system is insignificant due to low complexity.

Since all channels do not always have the same influence on an entire audio service, some channels are very important, but some channels have a low priority. Therefore, the lossless compression technique is applied to a channel having a high priority, and an existing lossy compression technique is applied to a channel having a low priority so that it is possible to provide an audio service having a quality significantly higher than the existing lossy audio compression technique.

4. UHD Image Storage Format Technique (File Format Technique)

An MXF file format is analyzed and extended.

An extension file format module for UHD based on a developed MXF is implemented, and optimization and a performance test of the implemented module are performed.

Integration with S/W for editing is performed through a library of an integrated file format including an UHD image and a multi-channel audio.

5. HD-to/from-UHD Image Converting Technique (Image Scaling Technique)

Ultra high resolution image restoration technique: a frequency domain approach method, a non-uniform interpolation approach method, an optimization approach method, and a sampling-based approach method Regularized iterative image interpolation method: a high resolution image sequence is restored from a low resolution image, a large amount of information in an enhancement operation rapidly decreases when an interpolated image sequence is closer to an original image sequence having a high resolution, and a scaler may be used in an encoding method.

6. Technique for Correcting Color Between Images (Image Registration/Correction Technique)

A statistical color distortion model is generated.

A color and structure distortion model is independently generated and is unified through a test.

An iterative algorithm is generated in order to minimize error occurrence.

An image registration technique is developed to estimate mutual information in an actual image.

An optimization technique is developed to increase performance from a small amount of mutual information.

FIG. 1 illustrates an input/output system for an ultra high definition image according to an embodiment of the present invention. Hereinafter, the input/output system for an ultra high definition image according to the embodiment of the present invention will be described in detail with reference to FIG. 1.

As illustrated in FIG. 1, the input/output system for an ultra high definition image includes a data (content) providing device, a content input/output device, an editing device, and a content reproducing device. Needless to say, it is apparent that components other than the above-described components may be included in the system.

A data (content) providing device 100 includes a multi-channel audio input device, an HD/UHD video camera, an HD-VTR, and the like, and delivers data having an audio signal or a video signal to a content input/output device 110.

A content reproducing device 130 includes an image device, a UHD TV, a monitor, and a multi-channel audio reproducing device, and reproduces the audio signal or the video signal received from the content input/output device 110.

The content input/output device 110 receives the audio signal or the video signal from the data providing device 100, and provides the processed audio signal or video signal to the content reproducing device 130 as necessary. The content input/output device 110 provides the audio or video signal received from the data providing device 100 to an editing device 120 as necessary.

The editing device 120 edits the audio or video signal received from the content input/output device 110 according to a set method, and then provides the result to the content input/output device 110. The editing device 120 includes a storage device configured to temporarily store the audio or video signal received from the content input/output device 110 or the edited audio or video signal. In operations performed in the editing device 120, frames per second (fps), a resolution, and the number of audio channels are variably adjusted. Hereinafter, a configuration and operations of the content input/output device will be described in detail.

Figure 2:
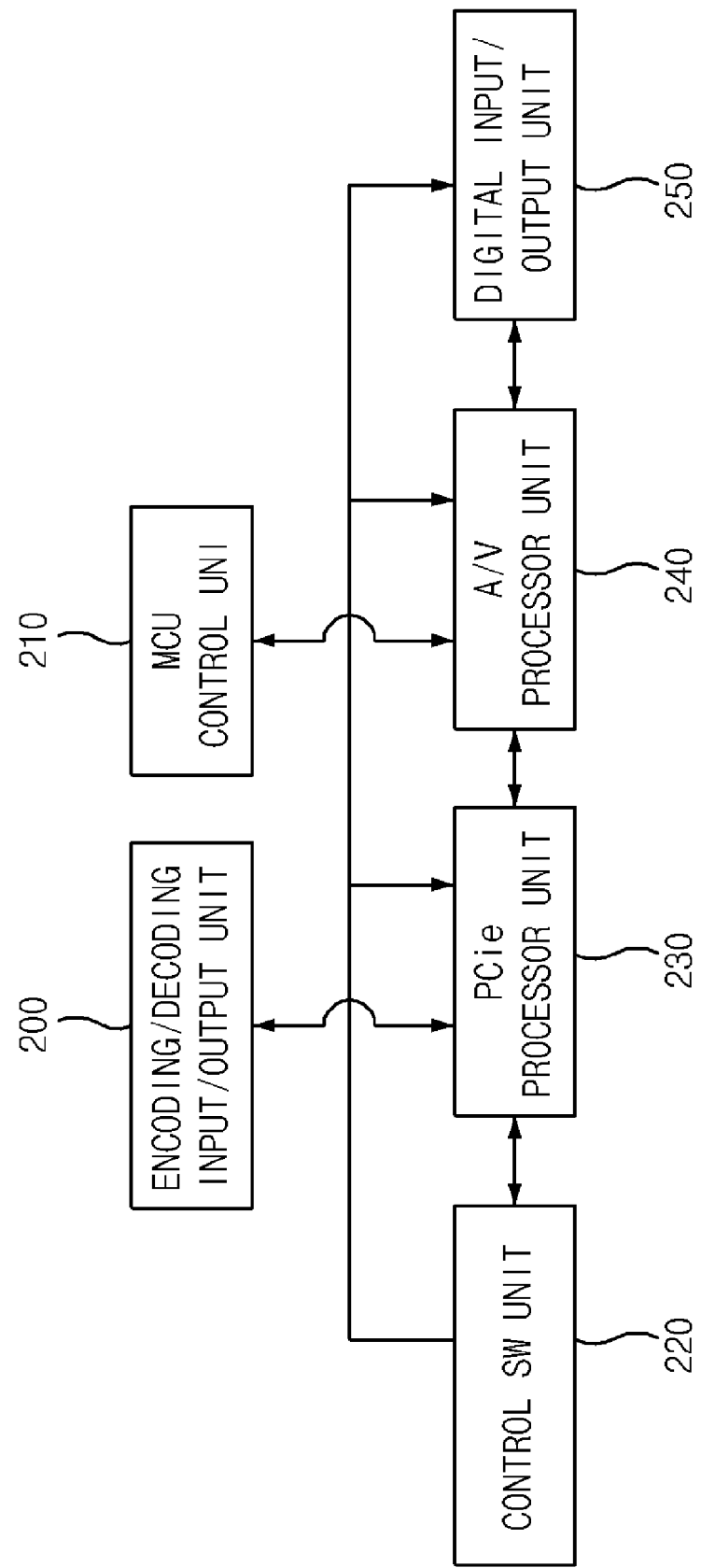
FIG. 2 illustrates a configuration of a content input/output device according to an embodiment of the present invention.

FIG. 2 illustrates a configuration of a content input/output device according to an embodiment of the present invention. Hereinafter, a configuration of the content input/output device according to the embodiment of the present invention will be described in detail with reference to FIG. 2.

As illustrated in FIG. 2, the content input/output device includes a digital input/output unit, an encoding/decoding unit, an MCU control unit, a control SW unit, a PCIe processor unit, and an A/V processor unit. Needless to say, it is apparent that components other than the above-described components may be included in the content input/output device.

A digital input/output unit 250 may provide interfaces for an SDI input/output, an optical input/output, and an HDMI input/output. Each input/output has a modular form that may be easily adapted to a change of an external interface later. An optical video interface module may include a component that converts an electrical signal into an optical signal and converts an optical signal into an electrical signal. Since the audio may also use 24 channels maximally in addition to the image, an SDI input/output module needs to process 8 audios per IC. An HDMI input/output module is an image and audio common interface based on no compression and no loss.

An A/V processor unit 240 is responsible for parallel distributed recording and reproducing. The A/V processor unit multiplexes/demultiplexes audio and video data input through multiple channels, and temporarily stores the data for synchronization of the input audio and video data. The final data synchronized and integrated in the A/V processor unit 240 is transmitted to and received from a PCIe processor unit 230 according to an A/V control signal.

When the integrated video and audio data is input, the PCIe processor unit 230 configured to transmit and store a large amount of high speed data converts the data into a PCIe transaction layer format, transmits the result to a PC through a PCIe lane, performs a reverse routine of the above input sequence when the data is output, and transmits the video and audio data to the A/V processor unit.

A control SW unit 220 controls overall operations of the content input/output device and includes a plurality of blocks. A register control block may control an internal register, a PCIe register, and an MCU register, and is configured to be easily applied to a system having a plurality of UHD boards by selecting a corresponding board when a plurality of boards are provided. Also, a DMA control block is a block that sets a memory size of PCI Express DMA, and is variably configured according to a PC and an OS since a memory size assigned to PCI Express varies depending on a PC system. A capture block controls setting of software and hardware while capturing, selects a video input source, determines a location in which a file will be stored, stores the file when a start button is pressed, and monitors DMA count or file storage count information. A display file control block controls setting of software and hardware while playing, selects a file source, selects a file to be loaded, and performs a reproducing operation when the start button is pressed.

An MCU control unit 210 sets and controls an initial register of a peripheral IC and FPGA.

An encoding/decoding unit 200 encodes the digital signal received from the digital input/output unit or decodes as necessary.

Figure 3:
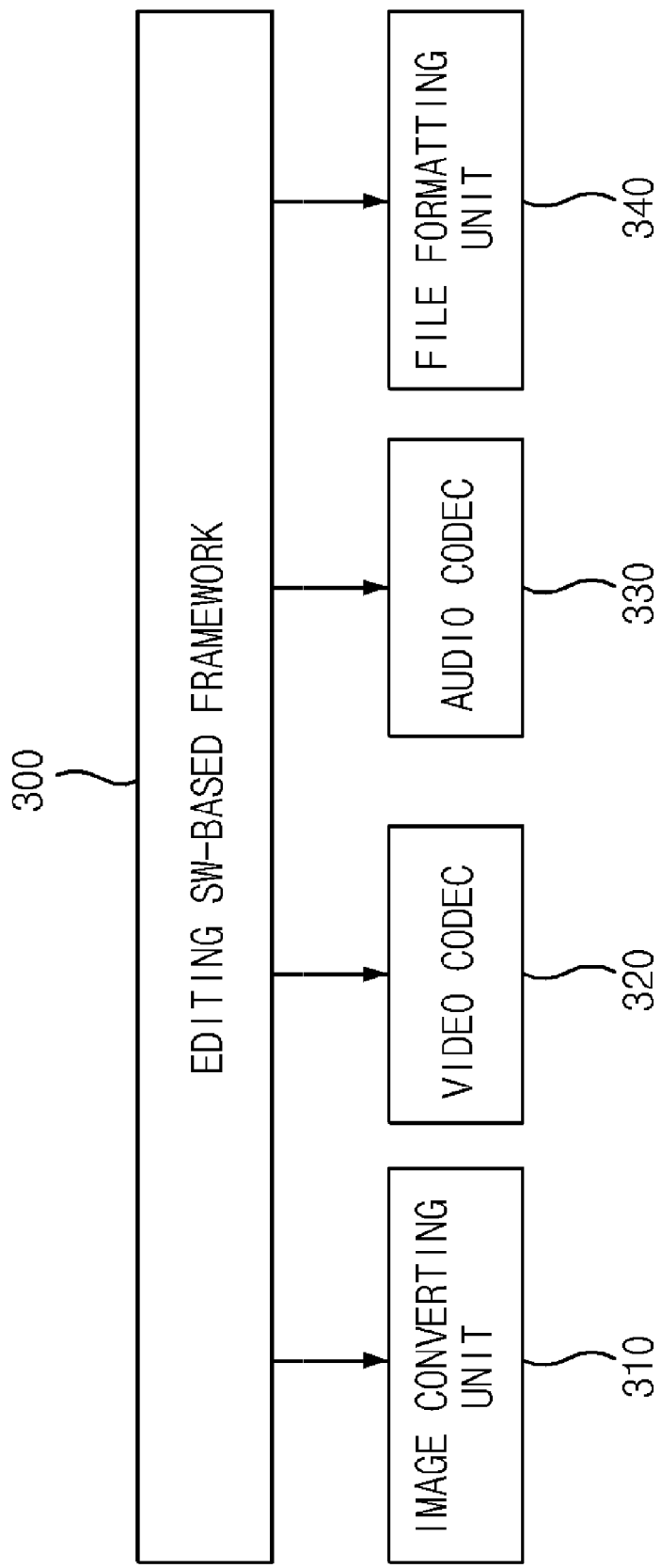
FIG. 3 illustrates a configuration of an editing device according to an embodiment of the present invention.

FIG. 3 illustrates a configuration of an editing device according to an embodiment of the present invention. Hereinafter, a configuration of the editing device according to the embodiment of the present invention will be described in detail with reference to FIG. 3.

As illustrated in FIG. 3, the editing device includes an editing SW-based framework, an image converting unit, a video codec, an audio codec, and a file formatting unit. Needless to say, it is apparent that components other than the above-described components may be included in the editing device.

An editing SW-based framework 300 is located in an upper layer of an image converting unit 310, a video codec 320, an audio codec 330, and a file formatting unit 340, and controls operations of corresponding components.

The image converting unit 310 converts an image captured by a capture unit according to a set method. That is, the image converting unit 310 converts the captured image into a UHD image. The video codec 320 compresses a video captured by the capture unit, and the audio codec 330 compresses an audio captured by the capture unit.

A bit stream is stored mainly using a Material Exchange Format (MXF), which is an SMPTE standard of a compressed image. For example, in a digital cinema standard, an uncompressed image is stored in TIFF, and when the image is compressed by JPEG-2000, the image is stored in MXF. The MXF (content exchange format) is a standard devised to exchange data for broadcasting (image, audio, meta data, and the like) among different broadcasting devices and is a file storage format standard standardized in Society of Motion Pictures and Television Engineers (SMPTE) 377M that defines a broadcasting and image related standard. In the previous analog era, a broadcasting production and editing environment had a linear structure. However, the digital era may have a non-linear (NLE) structure, and therefore inter-compatibility becomes important.

The file formatting unit 340 changes an MXF file format that is a method requested from the standard as described above.

Figure 4:
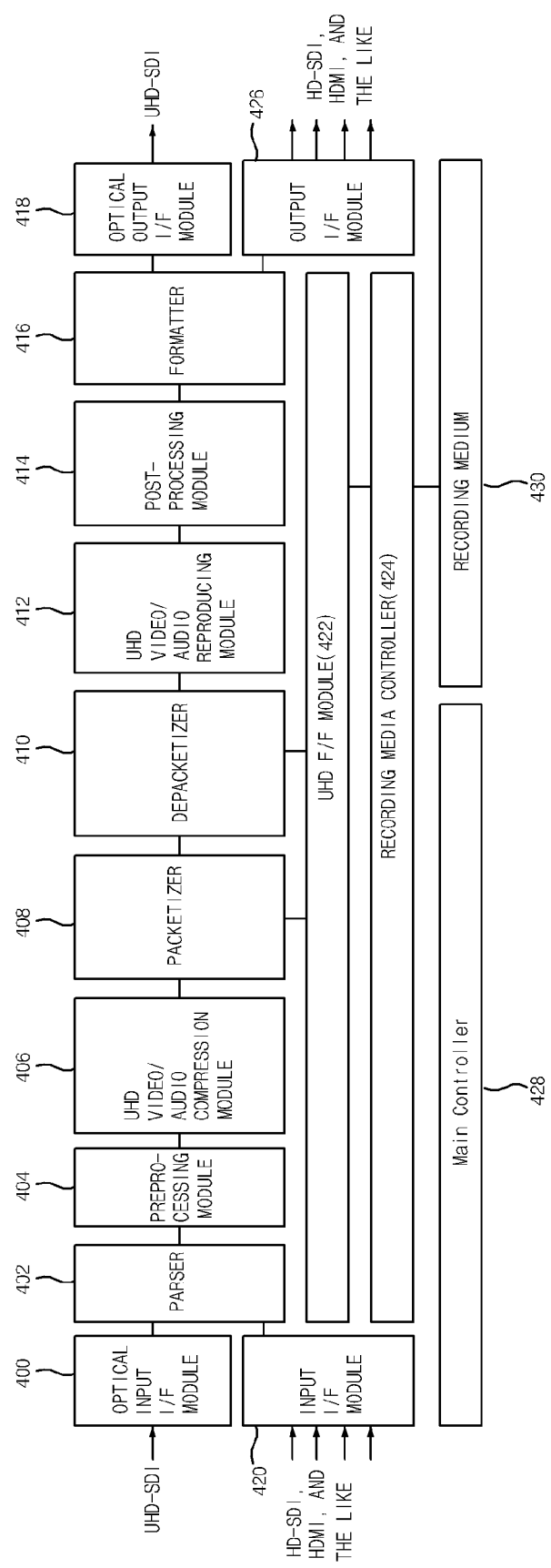
FIG. 4 is a diagram illustrating detailed configurations of the content input/output device and the editing device according to an embodiment of the present invention.

FIG. 4 is another diagram illustrating detailed configurations of a content input/output device and an editing device according to an embodiment of the present invention. Hereinafter, the configurations of the content input/output device and the editing device according to the embodiment of the present invention will be described in detail with reference to FIG. 4.

As illustrated in FIG. 4, the content input/output device and the editing device include an optical input interface module, an input interface module, a parser, a preprocessing module, a UHD video/audio compression (encoding) module, a packetizer, a depacketizer, a UHD video/audio reproducing (or decoding) module, a post-processing module, a formatter, an optical output interface module, an output interface module, a UHD F/F module, a recording media controller, a main control unit, and a recording medium. Needless to say, components other than the above-described components may be included in the content input/output device and the editing device.

An optical input interface module 400 receives UHD data from an external device. An input interface module 420 receives SDI and HDMI data from the external device. A parser 402 edits the data received from the optical input interface module 400 or the input interface module 420.

A preprocessing module 404 preprocesses the data edited by the parser 402. In the present invention, the preprocessing may include a process of encoding the received data.

A UHD video/audio compression (encoding) module 406 compresses the data that has been preprocessed in the preprocessing module 404. The compressed data is provided to a packetizer 408. The packetizer 408 packetizes the compressed data.

The packetized data is provided to a UHD F/F module 422. The UHD F/F module 422 converts the data received from the packetizer 408 into UHD data and then stores the result. The stored UHD data is delivered to a depacketizer 410 as necessary.

The depacketizer 410 converts the received UHD packet data into general data. A UHD video/audio reproducing (decoding) module 412 decompresses compression of the received data, and a post-processing module 414 performs a decoding process of the received data.

A formatter 416 converts the data that has been decoded into a set format, and then provides the result to an external reproducing device through an optical output interface module 418 or an output interface module 426.

A recording media controller 424 controls the data processed by the UHD F/F (file format) module 422. That is, the recording media controller 424 performs control such that the data processed by the UHD F/F module 422 is stored in a recording medium 430. A main control unit 428 controls overall operations of the editing device. The recording medium 430 temporarily stores the data processed by the UHD F/F module 422 according to a command of the recording media controller 424.

Figure 5:
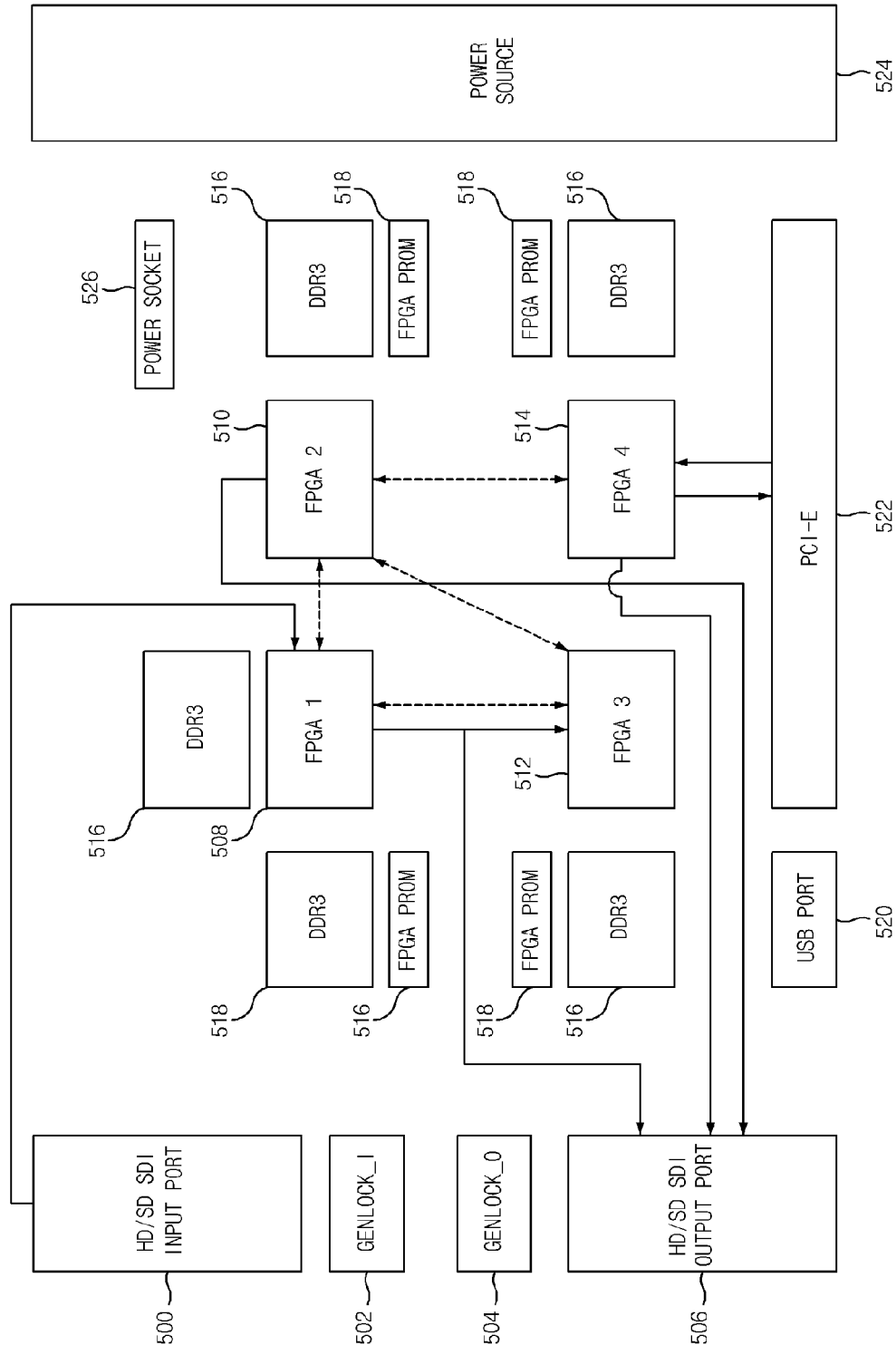
FIG. 5 is another diagram illustrating a configuration of the input/output device according to an embodiment of the present invention content.

FIG. 5 is another diagram illustrating a configuration of the content input/output device according to an embodiment of the present invention. Hereinafter, the configuration of the content input/output device will be described in detail with reference to FIG. 5.

As illustrated in FIG. 5, the content input/output device includes an HD/SD SDI input port, an HD/SD SDI output port, a USB port, a plurality of recording media, a plurality of chips, a power socket, a power source unit, a genlock input unit, and a genlock output unit. Needless to say, it is apparent that components other than the above-described components may be included in the content input/output device.

An HD/SD SDI input port 500 is a port configured to receive an HD or SD image from the outside. An HD/SD SDI output port 506 is a port configured to output the HD or SD image to the outside. A USB port 520 is a port configured to receive or output an image using a USB.

A plurality of chips 508, 510, 512, and 514 include a video encoding chip, a video decoding chip, an audio encoding chip, an audio decoding chip, and a firmware chip, and one chip may perform a plurality of functions. That is, the video encoding chip may simultaneously perform audio encoding and decoding. Each chip safely stores necessary data using a memory such as a DDR3 516 and an FPGC PROM 518.

A power socket 526 is a socket configured to receive power from the outside, and a power source 524 drives the content input/output device using power received through the power socket.

The genlock is used for synchronization between 4K boards. For example, when two 4K boards are installed to implement a 4K stereoscopic video, a genlock module synchronizes left and right 4K images. A genlock input unit 502 inputs a genlock signal, and a genlock output unit 504 outputs a genlock signal.

A PCI-E 522 is responsible for a PCIe bus, and transmits and receives a large amount of UHD data.

FIG. 6 illustrates a specification of an input/output system for an ultra high definition image according to an embodiment of the present invention. As illustrated in FIG. 6, the specification of the input/output system for the ultra high definition image includes a video input/output, a support format, a PC interface, a record, communication/UI, a PC specification, and the like.

The video input/output includes items of an input, an output, a resolution, and an audio. The support format includes items of an image and an audio. The PC interface includes items of an input/output and an input/output rate. The record includes items of a recording medium/capacity and a recording rate. The communication/UI includes items of communication and a UI. Also, FIG. 6 describes a specification of each item in detail. Needless to say, the specification described in FIG. 6 is only an example, and a specification other than the described specification may be used.

While the present invention has been described with reference to the embodiments illustrated in the drawings, these are only examples, and it may be understood by those skilled in the art that various modification and other equivalent embodiments may be made.

| Reference Numerals | |
|---|---|
| 100: content providing device | 110: content input/output device |
| 120: editing device | 130: content reproducing device |

What is claimed is:

1. A ultra-high definition (UHD) data converting system that converts data having various resolutions into UHD data, the system comprising:
    a content input/output device configured to provide data received from a data providing device to an editing device and provide the data received from the editing device to a content reproducing device; and
    the editing device configured to convert the data received from the content input/output device into UHD data and provide the result to the content input/output device,
    wherein the content input/output device includes a compression module configured to compress the data received from the content reproducing device, a packetizer configured to packetize the compressed data received from the compression module, and a depacketizer configured to depacketize a UHD content packet received from the editing device, and
    wherein the editing device includes a UHD file format (F/F) module configured to convert the data received from the packetizer into the UHD content packet, store the UHD content packet on a recording medium of the editing device, and transmit the UHD content packet to the depacketizer of the content input/output device.

2. The system according to claim 1,
    wherein the content input/output device includes:
    an input interface configured to receive data from the data providing device;
    a parser configured to analyze the data received from the input interface; and
    a preprocessing module configured to encode the data received from the parser.

3. The system according to claim 2,
    wherein the content input/output device includes:
    a reproducing module configured to decompress compression of data depacketized from the UHD content packet;
    a post-processing module configured to decode the data received from the reproducing module;
    a formatter configured to convert the data received from the post-processing module into a set format; and
    an output interface module configured to deliver the data received from the formatter to the content reproducing device.

4. The system according to claim 3,
    wherein the recording medium is configured to temporarily store the UHD content packet.

5. The system according to claim 4,
    wherein the editing device includes a recording media controller configured to perform control such that the UHD content packet processed by the UHD F/F module is temporarily stored in the recording medium.

6. The system according to claim 1, wherein the content input/output device includes:
    a digital input/output interface configured to receive data from the data providing device and provide UHD content to the content reproducing device;
    an encoder/decoder configured to encode the data received from the digital input/output unit or encode or decode converted UHD data;

an AV processor configured to multiplex or demultiplex audio and video data input through multiple channels and deliver synchronized data to a PCIe processor; and the PCIe processor configured to instruct temporary storage of the synchronized data received from the AV processor.

7. The system according to claim 6, wherein the editing device includes:

an image converter configured to convert video data captured by a capture unit according to a set method;

a video codec configured to encode the video data captured by the capture unit;

an audio codec configured to encode audio data captured by the capture unit; and a file formatting unit configured to convert the encoded video or audio data into a set format.

* * * * *